No. 767,764. PATENTED AUG. 16, 1904.
L. T. ROBINSON.
POWER FACTOR INDICATOR.
APPLICATION FILED NOV. 5, 1902.
NO MODEL. 2 SHEETS—SHEET 1.

Witnesses
George W. Tilden.
Green Oxford

Inventor.
Lewis T. Robinson.
by Albert G. Davis
Att'y

No. 767,764. Patented August 16, 1904.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

POWER-FACTOR INDICATOR.

SPECIFICATION forming part of Letters Patent No. 767,764, dated August 16, 1904.

Application filed November 5, 1902. Serial No. 130,152. (No model.)

*To all whom it may concern:*

Be it known that I, LEWIS T. ROBINSON, a citizen of the United States, residing at Schenectady, county of Schenectady, State of New York, have invented certain new and useful Improvements in Power-Factor Indicators, of which the following is a specification.

My present invention relates to means for measuring or indicating the power factor of alternating-current circuits, and is embodied in a novel type of instrument in which a movable element is acted upon inductively by a plurality of motor elements the torques of which are adapted to vary relatively to each other in response to variation of power factor and in which the movable element is so constructed that it may turn into a position in which the torques of the motor elements balance each other. When there is no wattless current flowing, the movable element assumes a certain given or neutral position and is deflected either to one side or the other from this position when wattless current does flow, the degree of deflection serving as a measure of the power factor and the direction of deflection as an indication as to whether lagging or leading current is flowing.

The novel features which I believe characterize my invention I have pointed out with particularity in the appended claims, while the invention itself I have described in detail in the following specification, which is to be taken in connection with the accompanying drawings, in which—

Figure 1:
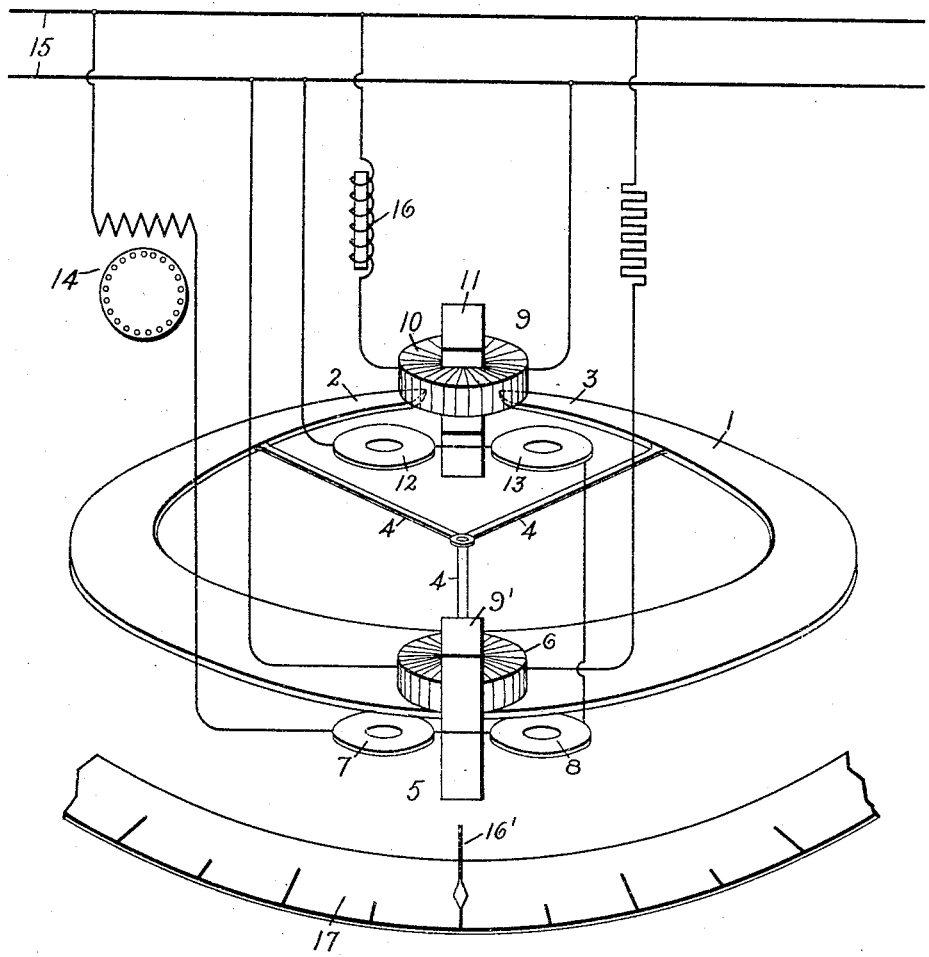
Figure 2:
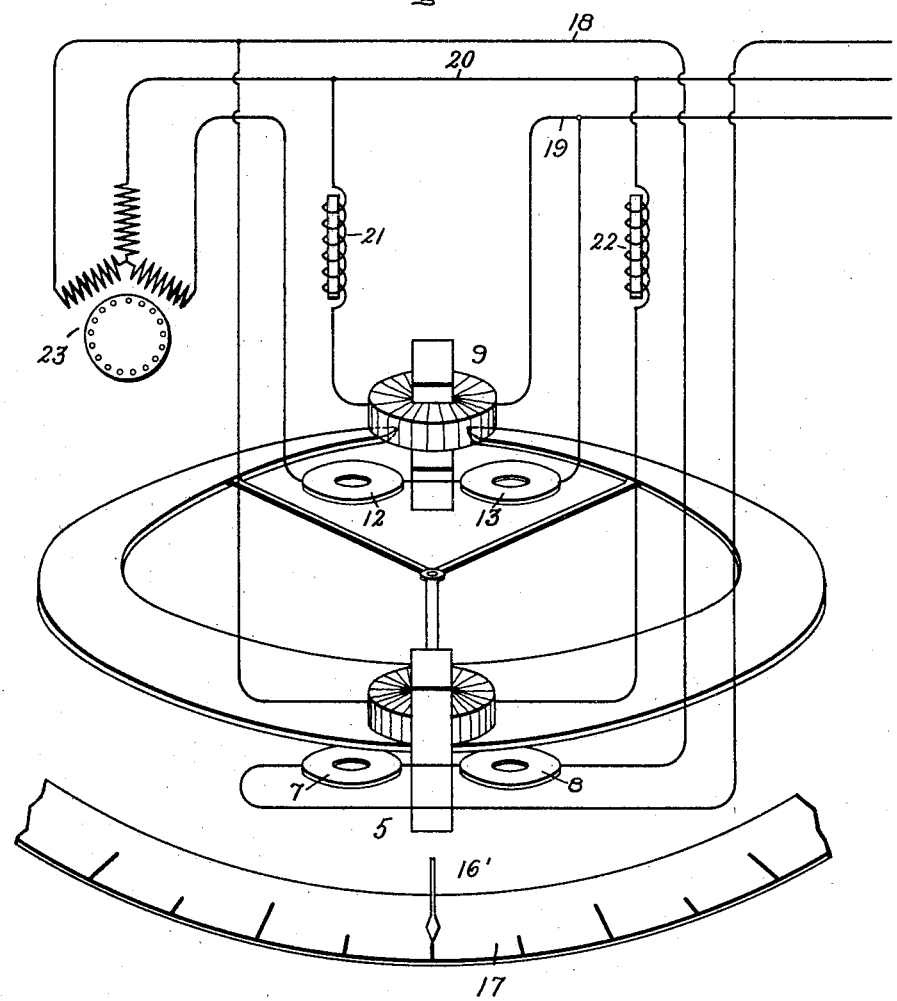

Figure 1 represents my invention as embodied in an instrument for indicating the power factor of a single-phase alternating current, while Fig. 2 shows an instrument arranged to indicate the power factor of a three-phase alternating current.

In Fig. 1 the movable element of the indicator consists of a somewhat ring-shaped member 1, having a portion thereof cut away, so as to form two opposing prongs 2 3 of a somewhat tapered outline. The movable member is carried by a pivoted support in the same manner as the rotating member of an ordinary alternating-current induction-meter, the light spokes 4 serving to connect the ring 1 with the pivoted shaft. (Not shown.)

Mounted in operative relation to the ring 1 and separated from each other to a suitable extent are two motor elements, each consisting of a potential-coil and two current-coils similar to the motor elements of ordinary alternating-current induction-meters. The motor element (indicated generally at 5) consists of a potential-coil 6 and two current-coils 7 and 8, connected in series with each other. The potential-coil 6 is mounted upon one limb of a magnetic core 9′, between the jaws of which the movable ring 1 is adapted to pass freely. The current-coils 7 and 8 are located beneath the ring 1, one at one side of the potential-coil and one at the other. The other motor element, 9, is similar to the motor element 5 and consists of a potential-coil 10, mounted upon a core 11, and two coöperating series-connected current-coils 12 13, the motor element as a whole being arranged like the motor element 5, so that the pivoted or movable ring 1 may pass freely between the jaws of the core 11. In the particular arrangement shown the two motor elements 5 and 9 are arranged diametrically opposite each other.

As arranged in Fig. 1, the instrument is shown connected up for measuring the power factor of a circuit feeding an induction-motor, (represented conventionally at 14,) the circuit of the motor being shown connected across single-phase supply-mains 15. Current-coils 7 8 and 12 13 of the two motor elements are therefore connected in series with the induction-motor circuit.

One of the motor elements is made responsive to the wattless current flowing in the alternating-current circuit to which the indicator may be attached, while the other element is made responsive to the actual energy flowing in said circuit.

To make one of the motor elements of the indicator responsive to wattless currents; the potential-coil is connected to the supply-mains through a relatively large non-inductive resistance. Either of the motor elements may be thus connected; but, as shown in the drawings, I have represented the potential-coil 6 of the motor element 5 as thus arranged. It will be evident that when there is no wattless current flowing the current in the potential-coil 6 will be in phase with the current in the current-coils 7 and 8, under which conditions there will evidently be no torque exerted by the motor element 6 upon the movable element 1 of the indicator. The potential-coil 10 of the other motor element is, however, connected to the supply-mains through an inductance-coil 16, the purpose of which is to produce in the potential-circuit a current lagging as nearly as possible to ninety degrees behind the impressed electromotive force. As thus arranged, the motor element 9 produces a maximum torque when the power factor is at or near unity and less torque as the amount of lagging current increases. The motor element 9 operates to turn the movable element of the meter until the prongs 2 and 3 of the movable element are brought around into proximity to the motor element. When there is no wattless current flowing, this turning action brings the prongs into substantially symmetrical relation with the motor element 9, one prong lying at one side of the potential-coil and the other prong at the other side. The alternating field produced by the motor element 9 tends to repel each prong out of the field, with the result that the movable element turns until it assumes a position where the forces of deflection are balanced, this position being a symmetrical position, as shown in the drawings, when there is no torque produced by the motor element 6, a condition which exists when no lagging current is flowing in the circuit. If, however, a lagging current is flowing, such as would exist when the motor 14 is connected in circuit, the current in the current-coils 7 and 8 is no longer in phase with the electromotive force impressed upon the potential-coil 6, but lags behind the current in the potential-coil. The fluxes produced by the current-coils and the potential-coil of the element 5 therefore give rise to a rotary field, which acting inductively upon the rotating member 1 turns the same about its axis of rotation in opposition to the torque exerted by the motor element 9 upon one or the other of the prongs 2 3. As the angle of deflection of the movable member increases one of the prongs is moved more and more into and through the magnetic field of the motor element 9. The prongs of the movable member being tapered give rise to stronger and stronger induced or eddy currents, as one or the other of them is moved more and more against or in opposition to the field produced by the motor element 9. The turning of the motor element continues until the torque produced by the motor element 5 is balanced by that produced by the other motor element, 9. The angle of deflection of the movable element 1 may be indicated by means of a pointer 16', moving over a suitable scale 17, the deflection serving as a measure of the relation between the amounts of wattless current and energy current in the circuit, or, in other words, of the power factor. The deflection of the instrument will be at one side of the zero position when the wattless current is a lagging current and at the other side when it is a leading current.

In Fig. 2 the indicator is shown as applied to a three-phase alternating-current system for the purpose of measuring the power factor. The instrument is similar in construction to that already described in connection with Fig. 1, and its corresponding parts are therefore correspondingly designated. The two sets of current-coils 12 13 and 7 8 instead of being connected in series with each other, as in Fig. 1, are connected one set in series with one of the three-phase mains—such, for example, as the main 18—and the other set in series with another three-phase main, 19. The potential-circuit of the motor element 9 is connected across one pair of three-phase mains 19 20 and the potential-circuit of the other motor element, 5, across the mains 18 20. In each potential-circuit an inductance-coil is connected so as to cause the current to lag as nearly ninety degrees as possible, the inductance-coils being indicated at 21 and 22. With change of power factor of the system the torques produced by the motor elements vary relatively to each other, thereby causing the movable elements to rotate into a position where the torques are again balanced. The torques become equalized by the shifting of the prongs of the movable element relatively to one of the motor elements in a manner already described in connection with Fig. 1. A pointer 16', carried by the movable element and movable over a scale 17, serves to indicate the magnitude of the quantity measured.

The three-phase mains 18 19 20 are represented as supplying current to an induction-motor 23; but it is of course evident that the character of the load is immaterial so far as concerns my invention. Moreover, although I have shown my invention as applied to both single-phase and three-phase systems I do not wish to be limited thereto, since the invention is applicable to other alternating-current systems as well.

What I claim as new, and desire to secure by Letters Patent of the United States, is—

1. The combination of a plurality of motor elements, and a movable element within the inductive influence of said motor elements and adapted by shifting its position to vary the torque exerted thereon by one or more of said motor elements.

2. In an electrical instrument, the combination of a plurality of electromagnetic motor elements, and a movable element within the inductive influence of said motor elements and constructed so as to present portions of varying conductivity to the inductive influence of one or more of said motor elements as it is moved relatively thereto.

3. In an electrical instrument, the combination of motor elements, a relatively movable element within the influence of said motor elements and constructed so that by shifting its position relatively to the motor elements it operates to produce a balance between the torques exerted thereon by the motor elements, and means for observing the relative motion of said relatively movable element.

4. In an electrical instrument, the combination of two motor elements, one responsive to the flow of wattless current in an alternating-current system and the other to the flow of energy current in such system, and a member in operative relation to the motor elements and arranged so as to be movable into a position wherein the torques exerted thereon by the motor elements are in a condition of balance.

5. In an alternating-current instrument, the combination of a movable member the continuity of which is interrupted in the direction of its movement, two motor elements each mounted to act inductively upon the movable element, means for rendering the torque produced by one of the motor elements responsive to the wattless current flowing in an alternating-current circuit, means for rendering the torque of the other motor element responsive to the energy current flowing in such circuit, and means for observing the deflections of the movable member corresponding to positions where the torques produced by the two motor elements are balanced.

6. In an electrical instrument, the combination of a movable member, two motor elements mounted each in inductive relation to the movable member and provided respectively with current and potential coils, means for causing one of the elements to exert a torque upon the movable member responsive to the wattless current of an alternating-current system, and means for causing the other motor element to exert a torque upon the movable member responsive to the energy current of the system.

In witness whereof I have hereunto set my hand this 1st day of November, 1902.

LEWIS T. ROBINSON.

Witnesses:
 BENJAMIN B. HULL,
 MARGARET E. WOOLLEY.